US010723481B2

(12) United States Patent
Gerard

(10) Patent No.: US 10,723,481 B2
(45) Date of Patent: *Jul. 28, 2020

(54) METHOD AND SYSTEM FOR MONITORING AND SECURING AN ENCLOSURE OF A VEHICLE, IN PARTICULAR OF AN AIRCRAFT

(71) Applicant: LATECOERE, Toulouse (FR)

(72) Inventor: Boucourt Gerard, Tolosan (FR)

(*) Notice: Subject to any disclaimer, the term of this patent is extended or adjusted under 35 U.S.C. 154(b) by 109 days.

This patent is subject to a terminal disclaimer.

(21) Appl. No.: 15/497,633

(22) Filed: Apr. 26, 2017

(65) Prior Publication Data

US 2017/0233098 A1  Aug. 17, 2017

Related U.S. Application Data

(62) Division of application No. 15/521,958, filed as application No. PCT/IB2015/058158 on Oct. 22, 2015.

(30) Foreign Application Priority Data

Oct. 28, 2014 (FR) .................................. 14 60358

(51) Int. Cl.
*B64D 45/00* (2006.01)
*H04N 7/18* (2006.01)

(52) U.S. Cl.
CPC ..... *B64D 45/0015* (2013.01); *B64D 45/0053* (2019.08); *B64D 45/0059* (2019.08); *H04N 7/181* (2013.01)

(58) Field of Classification Search
CPC .... B64D 2045/0035; B64D 2045/0045; B64D 45/0015; G06K 9/00771; H04N 7/181;
(Continued)

(56) References Cited

U.S. PATENT DOCUMENTS 5,742,336 A    4/1998  Lee
6,744,381 B1   6/2004  Collins
(Continued)

FOREIGN PATENT DOCUMENTS

EP    2239198    10/2010
EP    2680578    1/2014
(Continued)

*Primary Examiner* — Jessica M Prince
(74) *Attorney, Agent, or Firm* — Defillo & Associates, Inc.; Evelyn A Defillo

(57) ABSTRACT

The aim of the invention is to optimise the monitoring and security of at least one enclosure, allowing a constant and complete view of the enclosure, and a modulated assessment of the state of security of same. For this purpose, the invention proposes to transmit images of the enclosure wirelessly to a mobile medium for helping the flight crew assess the situation and the measures to take in case of a sensitive security situation. According to one embodiment, the optimised system for monitoring and securing an enclosure, a cockpit (3), a cabin (2) and/or a luggage hold (4) of an aircraft (1), comprises video cameras (21a to 23a, 21b to 23b, 24 to 28) distributed so as to define a field of view inside or outside the enclosure (2 to 4), mobile (2T) or fixed (3A) display media dedicated to members of the crew of the enclosure capable, via suitable wireless transmission/reception means (20A), of receiving image streams transmitted by the video cameras (21a to 23a, 21b to 23b, 24 to 28) and of connecting to auxiliary data sources and to means for locking/unlocking (7 to 10, 41) the enclosure (2 to 4) arranged in areas sensitive with respect to security.

10 Claims, 5 Drawing Sheets

(58) Field of Classification Search
CPC .......... H04N 1/00103; H04N 1/00137; H04N 1/00172; H04N 1/21; H04N 1/2112; H04N 1/4486; H04N 2201/0039; H04N 2201/0055; H04N 2201/0084; H04N 2201/3281; H04N 5/2252; H04N 5/23203; H04N 5/23206
See application file for complete search history.

(56) References Cited

U.S. PATENT DOCUMENTS

| | | |
|---|---|---|
| 6,864,805 B1 | 3/2005 | Gomez |
| 7,792,189 B2 | 9/2010 | Finizio et al. |
| 2003/0152145 A1* | 8/2003 | Kawakita ................ H04N 5/77 375/240.12 |
| 2004/0145498 A1 | 7/2004 | Carroll |
| 2004/0160340 A1* | 8/2004 | Thomson ........... B64D 45/0015 340/945 |
| 2010/0253781 A1* | 10/2010 | Sasson ............... B64D 45/0015 348/148 |
| 2012/0007981 A1* | 1/2012 | Guerrera ........... B64D 45/0015 348/143 |
| 2012/0140080 A1* | 6/2012 | Taylor ................ B60C 23/0408 348/148 |
| 2012/0183137 A1* | 7/2012 | Laughlin ................ H04N 7/185 380/200 |
| 2015/0009325 A1* | 1/2015 | Kardashov ............. H04N 7/183 348/143 |

FOREIGN PATENT DOCUMENTS

| | | |
|---|---|---|
| GB | 2393614 | 3/2004 |
| WO | WO2006/022824 | 3/2006 |

* cited by examiner

METHOD AND SYSTEM FOR MONITORING AND SECURING AN ENCLOSURE OF A VEHICLE, IN PARTICULAR OF AN AIRCRAFT

CROSS REFERENCE TO RELATED APPLICATION

This application is a divisional of U.S. patent application Ser. No. 15/521,958 filed on Apr. 26, 2017, which is a national stage entry of PCT/IB2015/058158 filed Oct. 22, 2015, under the International Convention claiming priority over French Patent Application No. 1460358 filed Oct. 28, 2014.

FIELD OF THE INVENTION AND PRIOR ART

The invention relates to an optimized method of monitoring and securing of the interior of a vehicle enclosure, especially a passenger cabin of an airplane, as well as a system designed to carry out such a method. The monitoring involves more particularly the cockpit, the passenger cabin and/or the cargo of the airplane, but it may be extended to other volumes, such as the empennage, the wings, or the immediate surroundings of the airplane.

The field of the invention is that of monitoring for purposes of securing of a vehicle enclosure by the transmission of images coming from video cameras disposed generally inside the vehicle on visualization screens. The invention applies in particular to airplanes, but it may also be applied to any vehicle enclosure likewise comprising a piloting station, such as a train, boat, coach, etc.

The images produced by the video cameras of a monitoring system installed, for example, in the cockpit and in the passenger cabin can be transmitted from a common transmitter to a ground station via a satellite. Such installations, illustrated for example by patent document U.S. Pat. No. 5,742,336, allow the recording of the images and possibly also the audio in order to later examine the flight conditions prevailing during a failure or an accident of the airplane.

There is likewise known from patent document U.S. Pat. No. 6,864,805 a system for monitoring the internal space of an airplane, comprising video cameras arranged in strategic manner in the cabin of the airplane, as well as visualization screens connected to the video cameras by wiring and installed in the cockpit. Moreover, the crew members who are present in the cabin carry transmitters which can activate via a receiver—in the event of an emergency—the video cameras, the visualization screens, and a visual alert located in the cockpit.

Moreover, the patent document U.S. Pat. No. 7,792,189 provides a multi-video-camera monitoring system in an airplane cabin designed to display images on display screens arranged in the cabin or on computer screens, the display screens and the computers being wired to a network linking to image storage servers. The system is able, through the network and the servers, to display on a screen an image selected by a crew member coming from one of the video cameras, or images coming simultaneously from several video cameras installed in different locations.

However, such systems are no longer adapted to the complex monitoring conditions imposed by the present configurations of certain vehicles, especially airplane cabins, or to the rigorous monitoring conditions imposed by potential acts of subversion or terrorism in this type of enclosure. Thus, the present-day airplane cabins no longer allow the flight personnel to monitor the cabin at every instant, especially when their observation stations no longer have a direct view of a portion of the cabin.

For example, in the critical phases of takeoff, landing, or flight in zones of turbulence, the flight personnel are on duty in seats, behind a partition, a curtain, a galley or some other zone which obscures the field of view.

Moreover, the known visualization devices are designed to realize a single man/machine interface with no real possibility of reconfiguration or interoperability between the devices of the flight personnel of the cabin, the mobile devices of the passengers, and the visualization screens of the piloting personnel in the cockpit.

SUMMARY OF THE INVENTION

The invention aims to optimize the monitoring and securing of at least one given enclosure, in particular an airplane enclosure such as a cabin, cockpit or cargo, by allowing a constant and complete view of the enclosure, as well as a modulated assessment of its security status.

To accomplish this, the invention proposes to transmit images of the enclosure by wireless link to a mobile medium. This mobile medium helps the flight personnel, wherever they are, to assess the situation and the measures to take in event of a security sensitive-situation.

More precisely, the object of the present invention is a method of optimized monitoring and securing of at least one vehicle enclosure, especially a piloting cockpit, a passenger cabin, and/or a cargo hold of an airplane, in which one or more camera shots distributed in the enclosure to define a field of view of substantially the entire enclosure provide, during a transmission stage, image streams to at least one mobile visualization medium which can move along with a crew member, remain in communication with him at all times and connect by wireless link to other mobile and/or fixed media, as well as to key elements of the enclosure in regard to security-sensitive zones.

Furthermore, the or each visualization medium is parametrized according to different visualization modes, making it possible to switch, in each mode, between display configurations, information transmission configurations, and passive and active monitoring configurations of the enclosure.

Moreover, if a degree of nonsecure status is selected to define the security situation of the enclosure, the visualization medium changes to an active alert configuration in which modulated actions are proposed on the key elements, alarms and modulated actions being automatically triggered according to the degree of nonsecure status selected, based on an image and/or audio processing, and transmitted to the crew members depending on the phase of transportation.

According to one preferred embodiment, the visualization modes provide access to at least certain of the following configurations: in display mode, between ordinary, thumbnail, and fixed display configurations, in communication mode, between configurations of information transmission, security announcement transmission, and transmission to a personalized so-called entertainment visualization system for each passenger, in monitoring mode of the enclosure, between a so-called passive monitoring configuration and a so called active alert monitoring configuration. The passive monitoring configuration is chosen from between one of the display configurations and a configuration of comparison of auxiliary situational data, pertaining to the chosen display configuration and furnished from displayed image streams and/or a management center, with prerecorded data showing different degrees of secure and nonsecure status.

Advantageously, the parametrization in multiple configurations of the mobile medium does not depend on the position of that medium, but rather its optimized use at every moment by the multifunctional possibilities of action which it affords in dependence on the need in use.

According to advantageous embodiments:

the camera shots are associated with audio recordings, as well as detections of temperature and/or pressure; thus, the visualization medium can receive streams of images and audio combined with auxiliary data, which thus makes it possible to have an increased number of parameters managed in optimized fashion by the configurations of the medium;

the camera shots are taken in a spectral band chosen from the visible/near infrared band and the infrared band in order to detect temperatures higher than a predefined value and/or a non-intrusive nocturnal vision;

one of the camera shots of an enclosure is mobile and autonomous to monitor a particular zone of the enclosure, in particular a zone occupied by a sick person or a person likely to become sick, or another sensitive zone to be monitored more particularly during an appropriate period of time;

the passive visualization configurations of the image streams show, as auxiliary situational data useful to the monitoring, technical data, in particular data on the temperature variation in the enclosure and/or outside the vehicle, altitude, visibility, pressure in the enclosure and/or outside the vehicle, audio data and/or data on elapsed time since the start of an event liable to significantly modify the stream of images from one and the same camera shot, or a locking status of a key element;

at least one camera shot is installed outside the vehicle, in particular behind a door/porthole and/or a vehicle skin, advantageously with an additional lighting adapted to nighttime mode;

the camera shots likewise transmit the streams of images and audio to at least one fixed visualization medium located in the piloting station of the vehicle;

the modes and the configurations of the visualization medium are chosen by a commercial/technical crew member who manages said medium depending on the phase of transportation, especially depending on the flight phase for an airplane;

the visualization medium identifies by biometrics or by code each crew member authorized to use that medium with predefined configurations for that crew member, depending on their duties;

in the event that the vehicle is an airplane, the configuration of the visualization medium is fixed in an automatic configuration during the critical flight phases of takeoff, landing, and/or turbulence, as a function of status data furnished by the avionics unit or furnished by geolocation in connection with the data of the A/C repeaters;

the camera shots have a variable field of view, in particular a reduced field, a wide field and a panoramic field, activated by action on a control of the visualization medium which transmits field of view setting signals to the camera shots;

the transmission of images, the transmission of setting signals for the field of view, and the wireless connections to the key elements are encrypted;

a signal consistency correlation between the camera shots is established in order to ensure the integrity of the auxiliary situational data and, if necessary, the selected degree of secure or nonsecure status;

the image data processing capacities are distributed between the camera shots and the visualization media;

audio/video sequences are recorded based on the selection of a first degree of nonsecure status;

links between the vehicle and the ground furnish updates for the configurations of the visualization media;

starting from a degree of nonsecure status, the visualization media can be cut off according to a mode chosen from the entering of a deactivation code, a double recognition reading, especially of a badge or the like, and an automatic deactivation, after which the visualization media switch to recording mode.

The invention likewise relates to a system of optimized monitoring and securing of the interior of a vehicle enclosure, especially a cockpit, a cabin, and/or a cargo of an airplane, intended to implement the method defined above. Such a system comprises one or more video cameras distributed in the enclosure, so as to define a field of view of substantially the entire enclosure. Mobile visualization media dedicated to members of the commercial personnel of the enclosure are able, via adapted wirelessly linked sending/receiving means, to receive streams of images sent by the video cameras, transmit commands to them, and communicate in two-way transmission with auxiliary data sources and also with means of locking/unlocking the enclosure, situated in security-sensitive zones. Moreover, means of modulated actions can be triggered on the means of locking/unlocking, as well as alarms and modulated actions according to the degree of non-secure status selected, based on an image and/or audio processing, and transmitted to the crew members depending on the phase of transportation.

According to preferred embodiments:

the video cameras may be associated with a microphone connected to a card for processing the audio into a transmission signal, as well as temperature and pressure probes;

the video cameras are digital with sensors which are photosensitive in spectral bands able to switch between the visible/near infrared band and the infrared band, and are outfitted with a digital processing module of the signals coming from the photosensitive sensors and the audio processing card, and the signals transmitted by the temperature and pressure probes;

at least one video camera is mobile and has an autonomous electrical power supply;

at least one video camera lens provided with dedicated lighting means is mounted outside the vehicle, in particular beneath or behind a porthole or a door in the case in which the vehicle is an airplane, in particular to monitor the flaps and the engines of the airplane;

the vehicle having a piloting station, a cockpit in the case of an airplane, at least one fixed visualization medium is installed on a base of this piloting station;

the video cameras have means of variation of the field of view and/or zoom controlled by the visualization medium via the wirelessly linked means of sending/receiving;

means of recording the video images and audio of the video cameras are provided in connection with the visualization media, either in the vehicle or on the ground, by adapted wirelessly linked means of sending/receiving;

the locking means which outfit the access doors of the enclosure of a vehicle and the entry/exit from the vehicle, emergency evacuation doors, and bathroom doors transmit by wireless link information on the locking/unlocking status to the electronic visualization media;

the visualization media, outfitted with a geolocation chip for a wireless communication connected to an internal transponder in A/C modes, itself connected to an avionics unit, are in vehicle/ground link via a wireless server and a router, the router being in transmitter/receiver connection with a ground base, in order to transmit to ground data regarding the security status of the vehicle and receive from the ground base scheduled data updates and new configurations to be integrated in the visualization media.

BRIEF DESCRIPTION OF THE FIGURES

Other characteristics and advantages of the invention will appear from perusal of the following description relating to a detailed exemplary embodiment, making reference to the enclosed figures which show, respectively.

DETAILED DESCRIPTION OF AN EXEMPLARY EMBODIMENT

Figure 1:
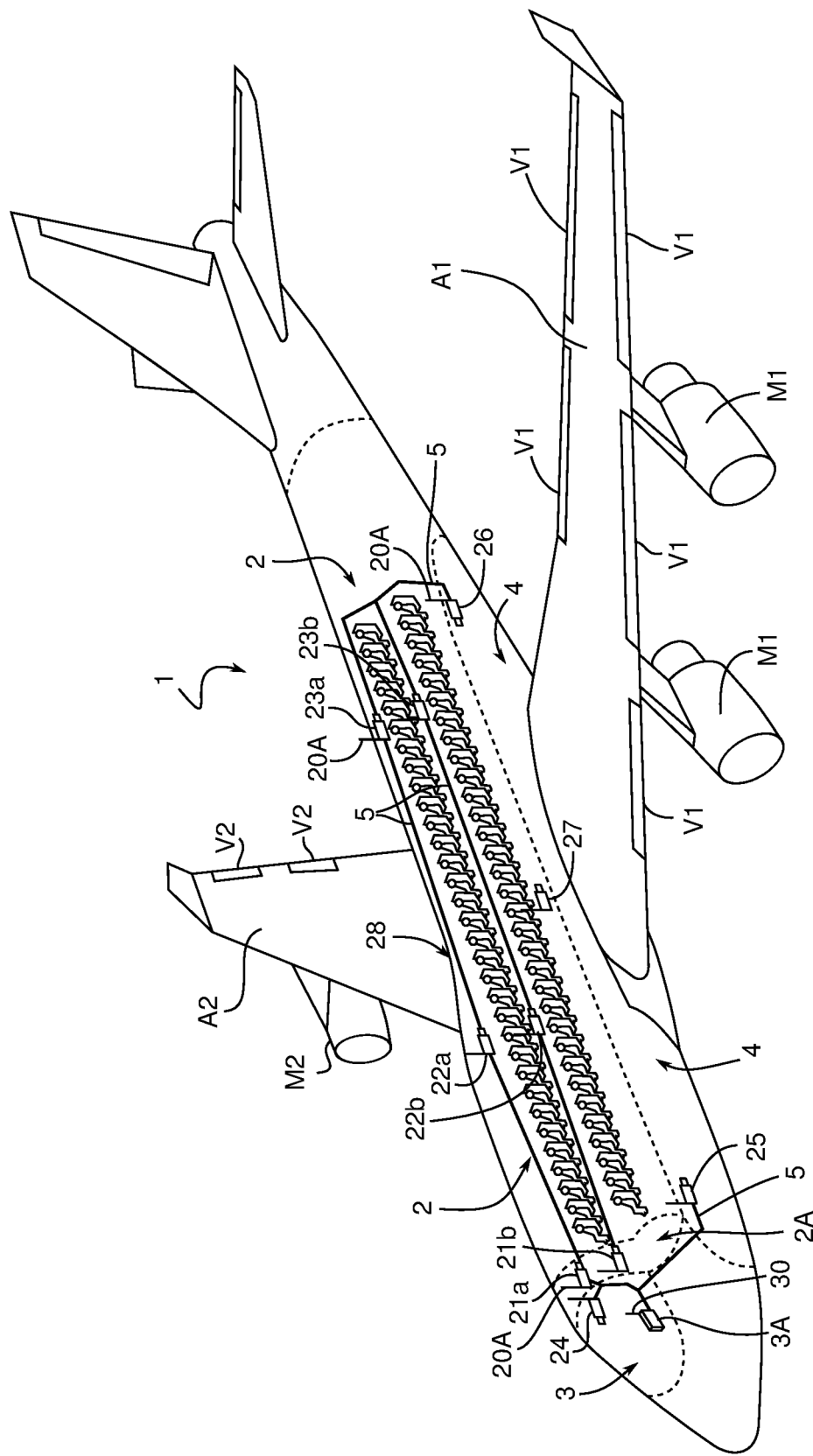
FIG. 1, a schematic perspective view of an airplane having a transparent skin outfitted with a system of monitoring and securing according to the invention.

A system of monitoring and securing according to the invention, making reference to the schematic perspective view of FIG. 1, outfits an airplane 1—presented with a transparent skin in order to visualize the interior—comprising in particular a passenger cabin 2, a piloting cockpit 3 and a cargo hold of merchandise being transported 4. In this system, two parallel series of three video cameras 21a to 23a, 21b to 23b, are distributed in the passenger cabin 2 to encompass, in combination, the entire field of view directly accessible to said cabin 2. Moreover, a video camera 24 is installed in the piloting cockpit 3 and two video cameras 25, 26 are installed in the cargo 4.

The video cameras 21a to 23a, 21b to 23b, 24 to 26 are outfitted with antennas 20A dedicated to the sending/receiving of image streaming signals and they are powered by electrical cables 5. As a variant, certain of the video cameras 21a to 23a, 21b to 23b, 24 to 26 can be connected by cables to provide the image streams. The piloting cockpit 3 is outfitted with a fixed visualization medium 3A for the image streams coming from the video cameras 21a to 23a, 21b to 23b, 24 to 26.

Advantageously, all the video cameras 21a to 23a, 21b to 23b, 24 to 26 are outfitted with a microphone 20M and a converter of audio 20C (see FIG. 5) into a transmission signal sent by the sending/receiving antennas 20A (see FIG. 5) of said video cameras 21a to 23a, 21b to 23b, 24 to 26.

Other video cameras 27 and 28 are likewise mounted outside the skin of the airplane 1, beneath a porthole Ha (see FIG. 4), on either side of the cabin 2. These video cameras 27, 28 are provided with diode lighting 59 or, as a variant, associated with such lighting disposed in the vicinity, in order to illuminate at night the elements which are more particularly monitored, namely the flaps V1, V2 of the wings A1, A2, and the engines M1, M2 of the airplane 1 in the present example. The video cameras 27 and 28 are likewise outfitted with sending/receiving antennas 20A located in the cabin 2.

Figure 2:
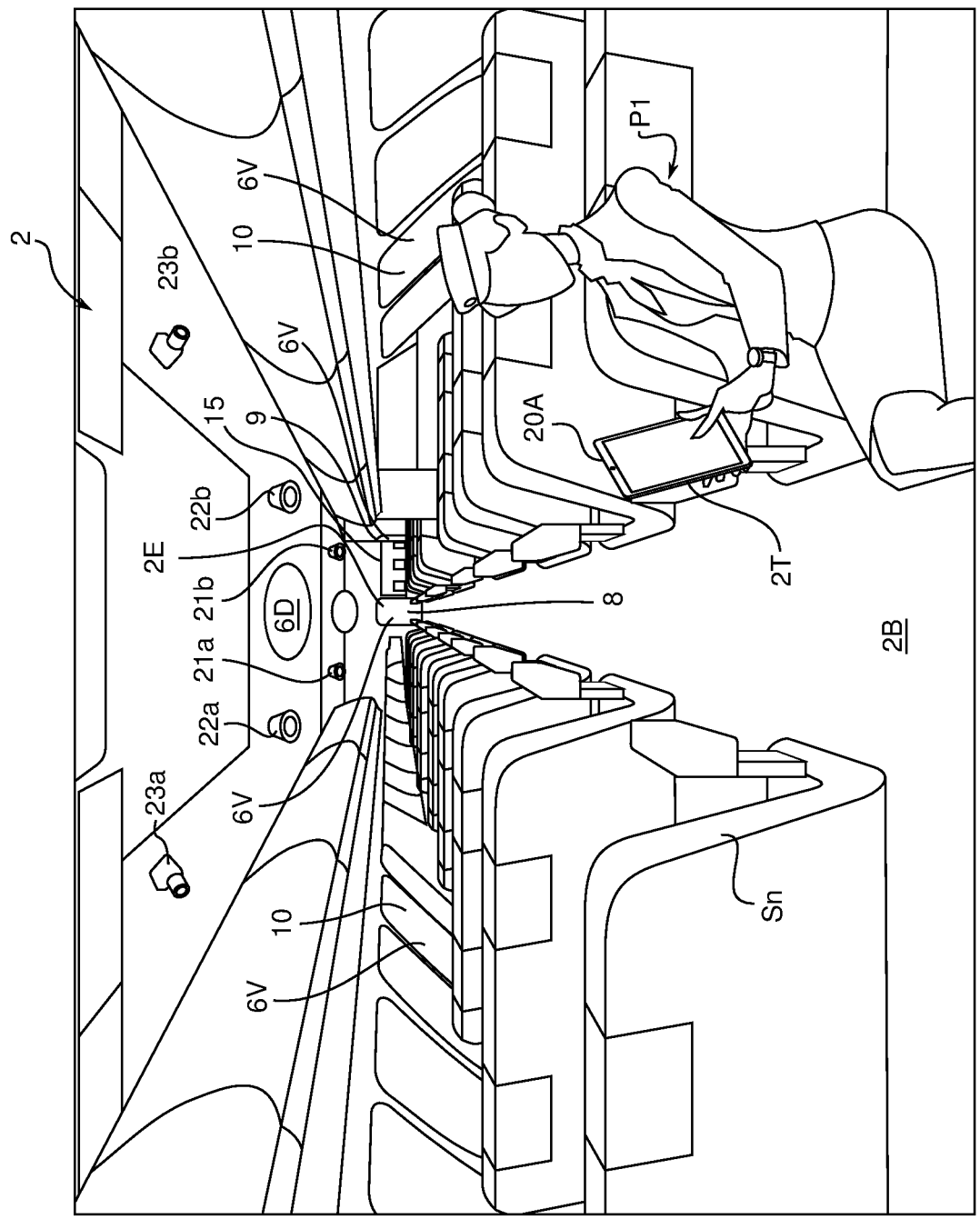
FIG. 2, an interior perspective view of the passenger cabin of the airplane according to FIG. 1.

In the passenger cabin 2 of FIG. 2, the image streams of the video cameras 21a to 23a, 21b to 23b are captured by sending/receiving antennas 20A of electronic visualization tablets 2T, serving as visualization media and held by the members of the commercial personnel P1. Moreover, these electronic tablets 2T are in wireless link with the smoke/fire detectors 6D, as well as the controls 6V for locking/unlocking the cabin doors namely the main entry/exit door of the airplane 7 (see FIG. 3), the access door to the cockpit 8, the bathroom doors 9 and the emergency evacuation doors 10.

The wireless links, generally speaking, are realized in radio frequency bands dedicated to transmission preferably by WIFI, but also in the DVB-T or DVB-T2 format, or else in amplitude modulation of LIFI type in the frequency band of visible light or even the near infrared.

The video cameras 21a to 23a, 21b to 23b, 24 to 26 here (see FIG. 1) are here digital CCD cameras with sensors which are photosensitive in a spectral band able to switch between an infrared band and a visible/near infrared band. The near infrared lighting allows a discreet lighting, particularly useful in nighttime mode. Alternatively, sensitive digital CCD video cameras used in the visible/near infrared spectral band are supplemented with thermal video cameras, making it possible to track a significant and rapid evolution of the temperature in a precise zone, such as where a gathering of persons is taking place or in the cargo to track an abnormal rise in the temperature.

Furthermore, one of the video cameras 21a to 23a, 21b to 23b or, alternatively, a supplemental camera is mobile and has an autonomous battery power supply. Such a mobile video camera can be moved into a particular zone of the cabin, for example, in order to display the galley 15, a seat Sn where a sick passenger (or one likely to become sick) is located, a child alone, an elderly person, or a special equipment item, etc., requiring constant attention.

Moreover, the tablets 2T are likewise in wireless link with a metal detector gate integrated in a frame 2E separating the passenger entrance area 2A (cf. FIG. 1) from the passenger seating space 2B making up most of the cabin 2.

Figure 3:
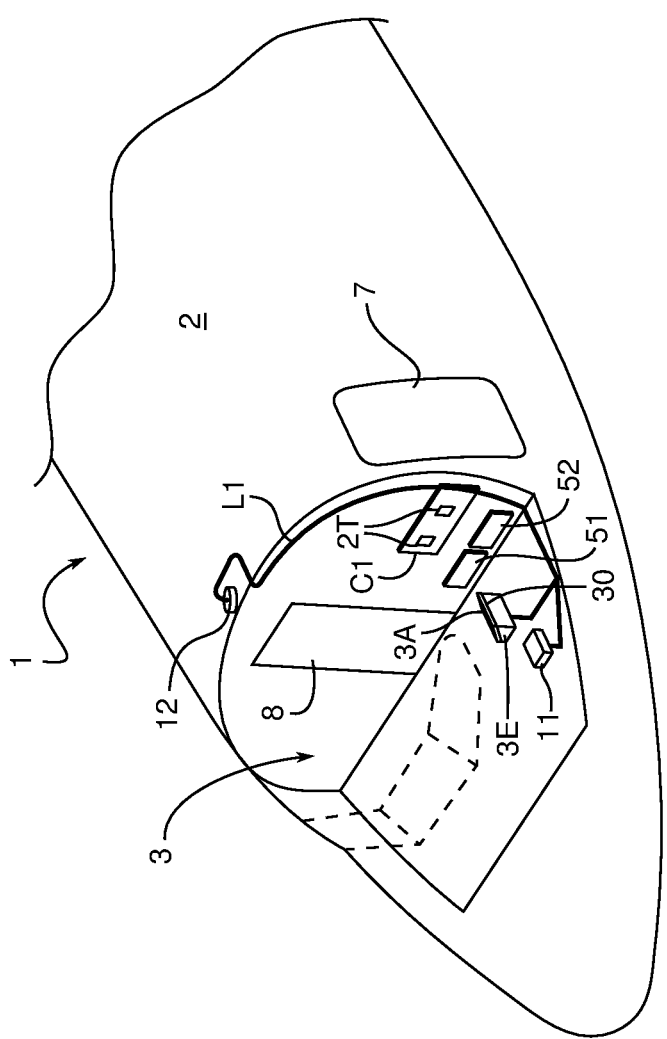
FIG. 3, a perspective view of the cockpit of the airplane according to FIG. 1.

Moreover, in the piloting cockpit 3 of the airplane 1, illustrated in FIG. 3, and accessible through the door 8, the visualization medium 3A for image streams coming from the video cameras 21a to 23a, 21b to 23b, 24 to 28 (see FIG. 1) is a fixed display handset, installed on a base 3E of the cockpit 3. Alternatively, this handset can be removable.

The display handset 3A is in wired link L1 with a router 12, situated in the cabin 2, which receives the audio and image signals of the video cameras. A server 11 is likewise connected to the router 12 by the cable L1. Alternatively, the display handset 3A is in wireless link with a sending/receiving antenna 20A like the tablets 2T of the cabin 2 (FIG. 2), and with the smoke/fire detectors 6D, the controls 6V for locking/unlocking the doors 7 to 10 of the cabin 2 (see FIG. 2).

Figure 4:
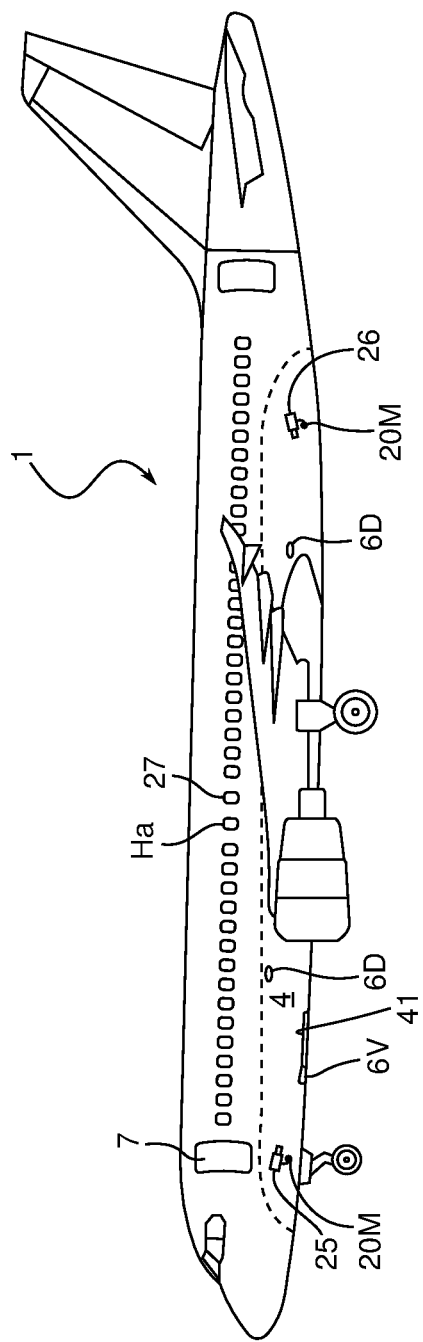
FIG. 4, an interior side view of the cargo of the airplane according to FIG. 1.

Making reference to FIG. 4, the cargo 4 of the airplane 1 is outfitted, as well as with video cameras 25 and 26 equipped with a microphone 20M, with two smoke/fire detectors 6D and controls 6V for locking/unlocking the doors/access hatches 41 to the cargo 4. The system according to the invention gives remote access rights to these key elements depending on the duties of the crew member.

Generally speaking (with reference to FIGS. 1 to 4), the video cameras 21a to 23a, 21b to 23b, 24 to 28 have mechanical, optical and electronic means (see FIG. 5) of variation of the field of view and zoom, these means being controlled by wireless link from the visualization media, the tablets 2T of the cabin 2 and the display handset 3A of the cockpit 3. Advantageously, the connections of the visualization media 2T, 3A to the key elements, to the video cameras and to other media (such as the cabin intercom data system, described below) are encrypted. In the remainder of the text, the common reference to the visualization media 2T, 3A refers to FIG. 1, 2 or 3 where these references 2T or 3A appear.

Moreover, the digital data processing of images and audio, as well as the recording of this data, is distributed between processing modules outfitting the video cameras 21a to 23a, 21b to 23b, 24 to 28, the visualization media, tablet 2T and display handset 3A, and the server 11 advantageously located in the cockpit (see FIG. 3), for linking with a ground base via the router 12.

Figure 5:
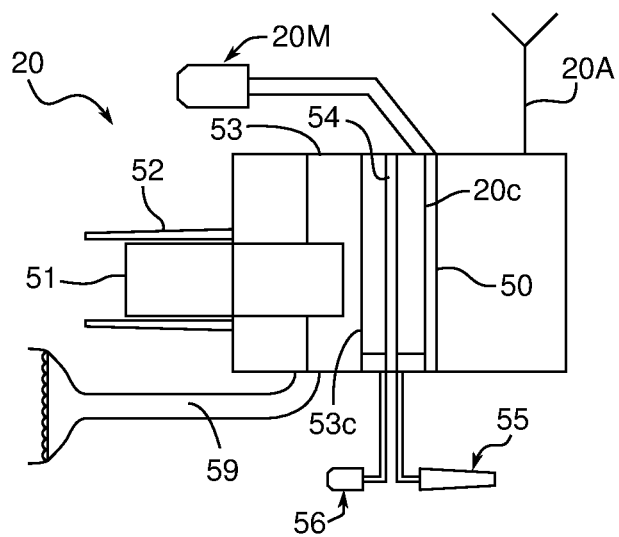
FIG. 5, a schematic cross-sectional view of a video camera of the system according to FIG. 1.

Referring to the schematic cross-sectional view of FIG. 5, the video camera 20, which can serve as a video camera 21a to 23a, 21b to 23b, 24 to 26 depending on the exemplary embodiment, comprises: a variable focus lens 51, an adjustment ring for the field of view 52, an electronics box 53 containing a charge coupled device (CCD) photosensitive sensor 53c connected to a digital signal processing card 54. At the output of the video camera, a sending/receiving antenna 20A sends video signals and receives control signals from the electronic visualization media 2T, 3A. The video camera is equipped with a microphone 20M, connected to a card 20C for converting audio into a signal transmitted to the digital processing card 54, as well as a diode lighting system 59. The video camera 20 is likewise equipped with temperature 55 and pressure 56 probes, these probes being connected to the digital processing card 54. The audio converter card 20C and the digital processing card 54 form a digital data processing module 50.

This processing module 50 for image data and audio signals provides to the electronic visualization media 2T, 3A not only image and audio streams, but also auxiliary internal visibility data as a function of the smoke content, the temperature, the pressure and the duration for automated monitoring. Such a processing is used in the active monitoring configuration, especially in automatic parametrization, to provide alarms and modulated alerts as a function of the degree of non-secure status of the enclosure and the flight phase, as will be explained below.

Moreover, the data on altitude, temperature and pressure inside and outside of the apparatus is furnished to the visualization media 2T and 3A, along with the data on geolocation coming from an avionics unit and transmitted to the visualization media 2T, 3A by WIFI communication via internal transponders in A/C modes. Alternatively, a transponder of the avionics unit sends a GPS signal in the cabin via a repeater which is read by GPS chips integrated in the visualization media 2T, 3A.

The visualization media are thus interconnected with the cabin intercom data system (CIDS). The CIDS makes it possible to control the comfort elements of the cabin (lighting, ventilation, pressurization, link to the doors). The visualization media 2T and 3A thus enable remote control of the data furnished by the CIDS.

During the various phases of a flight, the visualization media 2T and 3A are used in the following way.

Before takeoff, each crew member places their dedicated visualization medium 2T and 3A in operation, and unlocks this medium by the double reading of a personal badge. Alternatively, the visualization medium 2T and 3A is unlocked by a biometric recognition unit or by entering a personalized code. The crew members verify the functioning of the different configurations of the visualization media 2T and 3A. Depending on the duties of the crew member, the level of access to the different configurations is modulated.

Figures 6A, 6B, 6C:
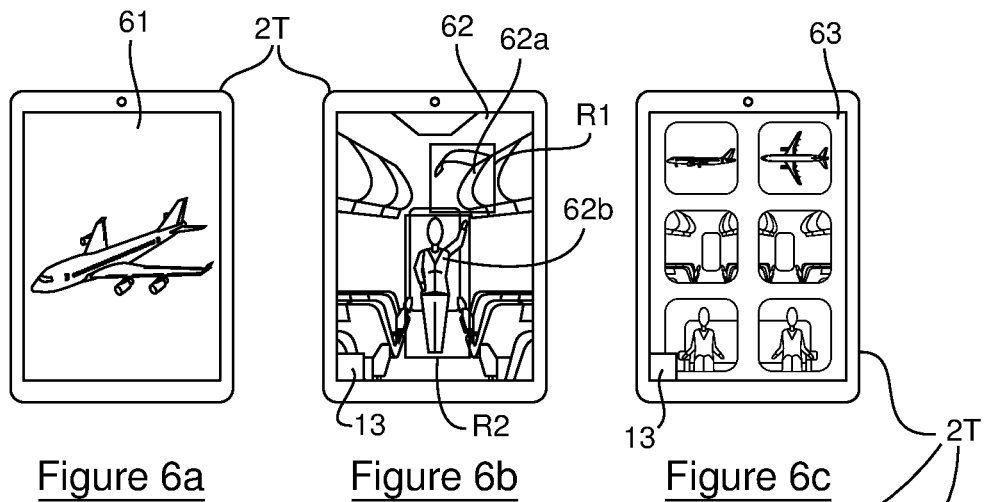
FIGS. 6a to 6g, different configurations of a visualization tablet of the system according to FIG. 1, respectively in fixed (FIG. 6a), ordinary (FIG. 6b), and thumbnail (FIG. 6c) configurations, in information transmission (FIG. 6d) or transmission to a personalized visualization system (FIG. 6e) configuration, and in passive visualization (FIG. 6f) or active alert (FIG. 6g) configurations.

During the takeoff phase, as defined by the data of status—acceleration, change in altitude, trajectory—furnished by the avionics unit or alternatively by the repeaters, the display of the visualization media 2T and 3A is regulated in fixed manner, as illustrated by FIG. 6a, in a display mode in automatic fixed configuration 61 known as a "takeoff" configuration. This fixed configuration, whether during takeoff or during any critical flight phase (turbulence or landing phases), makes it possible to receive information coming from the cockpit or from the ground. In fixed configuration, the tablets 2T are advantageously fixed in the cabin in a suitable location—for example, a vertical separation partition C1—facing the crew members who are seated on the dedicated seats S1, S2 (see FIG. 3).

When the takeoff phase is finished, the display of the visualization media 2T and 3A is then freed up by the internal data processing module of the medium 2T or 3A. The crew member can switch to an ordinary configuration 62 or a thumbnail configuration 63 of the images furnished by the video cameras 21a to 23a, 21b to 23b, 24 to 26 to 28, as shown respectively by FIGS. 6b and 6c. The moving between the ordinary 62 and thumbnail 63 configurations is done manually by a dedicated control 13, provided in the internal data processing module of said medium 2T or 3A.

Figures 6D, 6E, 6F, 6G:
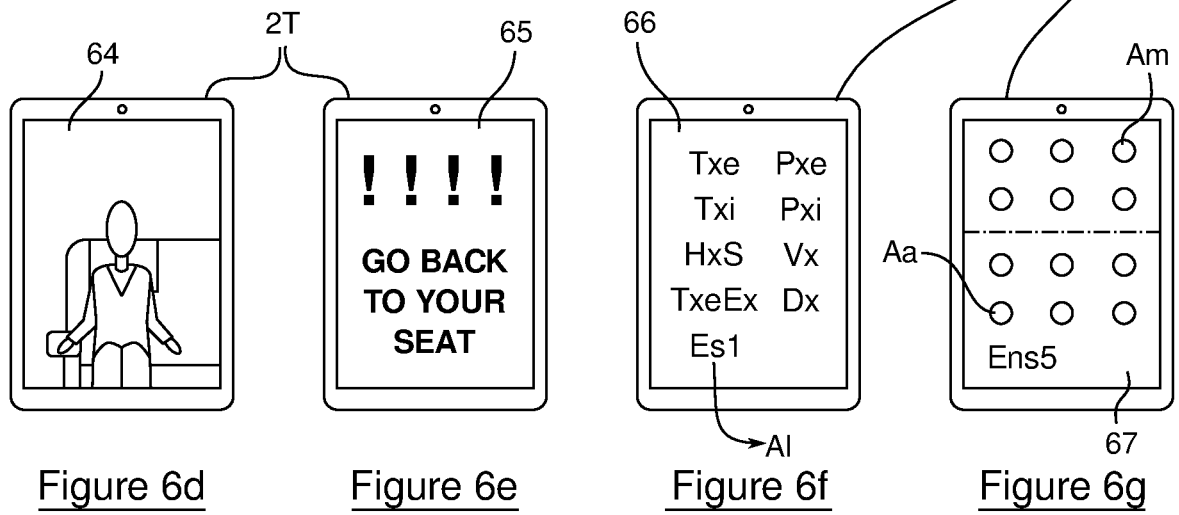

Alarms can be triggered by the tablet 2T upon detection of an anomaly from this stage on or at a more advanced stage, with non-secure statuses corresponding to an active alert configuration (see FIG. 6g). For example, in the ordinary configuration of FIG. 6b displaying the cabin from a blank camera (or in the active alert configuration of FIG. 6g in connection with the alarm Aa), zones where anomalies appear, an open luggage bin 62a or a person 62b moving around during turbulence, are surrounded by red rectangles, respectively R1 and R2, to be sent to the crew member who is ready to take action.

Other configurations illustrated respectively by FIGS. 6d to 6g can then be displayed by grouping into appropriate modes.

In communication mode, a configuration of transmission of information 64 (FIG. 6d) of auxiliary data is transmitted to the other visualization media 2T or 3A, this data possibly being accompanied by personal observations made on the images provided by the video cameras 21a to 23a, 21b to 23b, 24 to 26 to 28.

Still in communication mode, a dissemination configuration 65 (FIG. 6e) triggers an insertion of priority security information in the "entertainment" programs on the electronic equipment of the passenger seats. These communications are encrypted.

In monitoring mode, a passive display configuration chosen from the configurations of fixed, ordinary, and thumbnail display (FIGS. 6a to 6c) and a configuration of comparison of data 66 (FIG. 6f) based on information furnished by geolocation and analysis of the image and audio streams transmitted to the visualization media 2T and 3A. In this latter configuration 66, the variations in the auxiliary data are detected and provided by the image and audio data processing module of the cameras, from the avionics unit, and/or from the geolocation in combination with the data of the repeaters: variations in internal and external temperatures $Tx_i$ and $Tx_e$, for example, those of the galleys, in the altitude Hx, in the internal and external pressures Pxi and Pxe, data on the audio level Sx, the visibility Vx, and/or determination of the time Dx elapsed since the start of an event Ex able to significantly modify the stream of images from one and the same camera shot: a passenger leaves their seat or returns to it, a crew member moves into the field, people group together, a locking status of a door of the bathrooms.

A signal consistency correlation between the camera shots is established in order to ensure the integrity of the values of the auxiliary data. The auxiliary situational data is then compared against values of data of the same type, recorded in the processing module. These values show modulated degrees of securing statuses ranging from a perfectly secure status Es1 to an only just secure status Es10, then from a temporary nonsecure status Ens1 to a totally nonsecure status Ens10. Depending on the securing status of the actual situation in the cabin 2, the cockpit 3 or the cargo 4 (FIG. 1), a secure or nonsecure status is selected between Es1 and Ens10. The degrees of nonsecure status selected by different visualization media 2T or 3A are compared to ensure the integrity of a selected nonsecure status by correlation.

Audio/video sequences are automatically recorded from the selection of the first degree of nonsecure status Ens1 onward, these recordings will make it possible to produce means of investigation or to fill a base for analysis of critical situations. For example, the nonsecure status Ens1 might be a person who leaves their seat during a phase of turbulence when it is specifically mandatory for all passengers to remain seated with their seatbelt buckled. Advantageously, alarms Al sent from tablets 2T will automatically alert the crew members of such situations justifying classification as nonsecure status. For example, if a visibility Vx is below a given threshold, an alarm is triggered.

Moreover, again starting with nonsecure status Ens1, the visualization medium 2T or 3A switches to the active alert configuration 67 (FIG. 6g) in which modulated actions Am are proposed: the triggering of a sprinkler and/or the inerting of a waste item or a package in the vicinity of the fire/smoke detectors 6D (see FIG. 2), the locking of one of the doors 7 to 10 (see FIGS. 2 and 3), the blocking of access to the galley, an alert at the ground base. Thus, any potential danger should be considered in the course of its neutralization.

Modulated actions are then automatically triggered as of the selection of an elevated nonsecure status, status Ens5 in the example.

Starting with the selection of the nonsecure status Ens7, the visualization media are switched off by the entering of a deactivation code or, alternatively, by a double reading of a badge or a biometric measurement, or else by an automatic deactivation, and then the visualization media 2T and 3A switch to recording mode.

In the other critical flight phases—in event of turbulence or during landing—the configuration of the visualization media 2T and 3A switches to the automatic fixed configuration for takeoff.

The invention is not limited to the examples described or represented. For example, it is advantageous to utilize the links between the airplane and the ground to provide updates for the configurations of the visualization media.

Moreover, the number and the distribution of the video cameras or the visualization media are adapted to the architecture of the enclosures. The wireless connections have two-way transmission, so that the visualization media can receive the data from the sensors/key elements and send commands to these sensors/key elements.

The invention claimed is:

1. A system of optimized monitoring and securing of an interior of a vehicle enclosure including a piloting cockpit (3), a passenger cabin (2), or a cargo hold (4) of an airplane (1), the system comprising:
   one or more video cameras (21a to 23a, 21b to 23b, 24 to 26) distributed in the vehicle enclosure (2 to 4) to define a field of view of the entire enclosure (2 to 4);
   a mobile visualization device (2T), the mobile visualization device (2T) moves along with a crew member, remains in communication with the crew member at all times and connects by a wireless link to a second mobile device (2T) and/or fixed device (3A), the mobile visualization device (2T) is wirelessly linked to sending/receiving devices (20A), to receive images sent by the video cameras (21a to 23a, 21b to 23b, 24 to 26), and transmit commands to the video cameras (21a to 23a, 21b to 23b, 24 to 26), and also communicate in a two-way transmission with auxiliary data sources (11), and with a locking/unlocking device (6V) of the enclosure (2 to 4), situated in security-sensitive zones (7 to 10, 41);
   wherein each visualization device (2T) is parameterized according to different visualization modes, making possible to switch, in each mode, between display configurations (61 to 63), information transmission configurations (64, 65), and passive and active alert monitoring configurations of the enclosure;
   wherein a degree of non-secure status (Ens1 to Ens10) is selected to define a security situation of the enclosure (2, 3, 4), the visualization device (2T) changed to an active alert configuration (67) in which modulation actions are proposed on the locking/unlocking device, alarms (Al), and modulated action (Am) being automatically triggered according to the degree of non-secure status (Ens1 to Ens10), based on an image and/or audio processing, and transmitted to the crew members depending on a phase of transportation;
   wherein the securing of the interior of the vehicle enclosure is established by:
   a consistency correlation between the images of the video cameras (21a to 23a, 21b to 23b, 24 to 28) in order to ensure an integrity of an auxiliary situational data (Tx, Hx, Px, Sx, Dx) and optionally, a selected degree of secure status (Es1 to Es10) or the degree of nonsecure status (Ens1 to Ens10);
   encryption of images transmission device, of setting signals transmission for a field of view and of wireless connections to the locking/unlocking device (6V);
   a biometrics recognition device for each authorized crew member to use the mobile visualization device (2T) with predefined configurations (61 to 67) for a specific crew member.

2. The system of optimized securing and monitoring as claimed in claim 1, wherein the video cameras (21a to 23a, 21b to 23b, 24 to 26) are associated with a microphone (20M) connected to a card for processing the audio into a transmission signal of an audio processing card (20c), as well as temperature (55) and pressure (56) probes.

3. The system of optimized securing and monitoring as claimed in claim 2, wherein the video cameras (21a to 23a, 21b to 23b, 24 to 26) are digital cameras including sensors (53c), which are photosensitive in spectral bands and able to switch between a visible/near infrared band and an infrared band, and are outfitted with a digital processing module (50) of the signals coming from the sensors (53c) and the audio processing card (20c), and the signals transmitted by the temperature (55) and pressure (56) probes.

4. The system of optimized securing and monitoring as claimed in claim 1, wherein at least one video camera (21a to 23a, 21b to 23b) is mobile and has an autonomous electrical power supply.

5. The system of optimized securing and monitoring as claimed in claim 1, wherein at least one video camera lens (27, 28) provided with a dedicated lighting device (59) is mounted outside the vehicle beneath or behind a porthole (Ha) or a door (7) when the vehicle is an airplane (1), in particular to monitor flaps (V1, V2) and engines (M, M2) of the airplane (1).

6. The system of optimized securing and monitoring as claimed in claim 1, wherein the vehicle having a piloting station, a cockpit (3) in the case of an airplane (1), at least one fixed visualization device (3A) is installed on a base (3E) of the cockpit (3).

7. The system of optimized securing and monitoring as claimed in claim 1, wherein the video cameras (21a to 23a, 21b to 23b, 24 to 26) have a device for variation of the field of view and/or zoom controlled by the visualization device (2T) via a wirelessly linked for sending/receiving device (20A).

8. The system of optimized securing and monitoring as claimed in claim 1, wherein the two-way transmission with auxiliary data sources (11) and the audio of the video cameras (21a to 23a, 21b to 23b, 24 to 26) connect with the mobile visualization device (2T) by a wirelessly linked device (11, 12).

9. The system of optimized securing and monitoring as claimed in claim 1, wherein the locking device (6V) which outfits the access doors (8) of the enclosure (3) of a vehicle (1) and an entry/exit from the vehicle (7), emergency evacuation doors (10), and bathroom doors (9) transmit by wireless link information on the locking/unlocking status to electronics of the mobile visualization device (2T).

10. The system of optimized securing and monitoring as claimed in claim 1, wherein the mobile visualization device (2T), outfitted with a geolocation chip for a wireless communication connected to an internal transponder in A/C modes, the internal transponder is connected to an avionics unit, are in vehicle/ground link via a wireless server (11) and a router (12), the router (12) being in transmitter/receiver connection with a ground base, in order to transmit to ground data regarding the security status of the vehicle (1) and receive from the ground base scheduled data updates and new configurations to be integrated in the mobile visualization device (2T).

* * * * *